Figure 1:
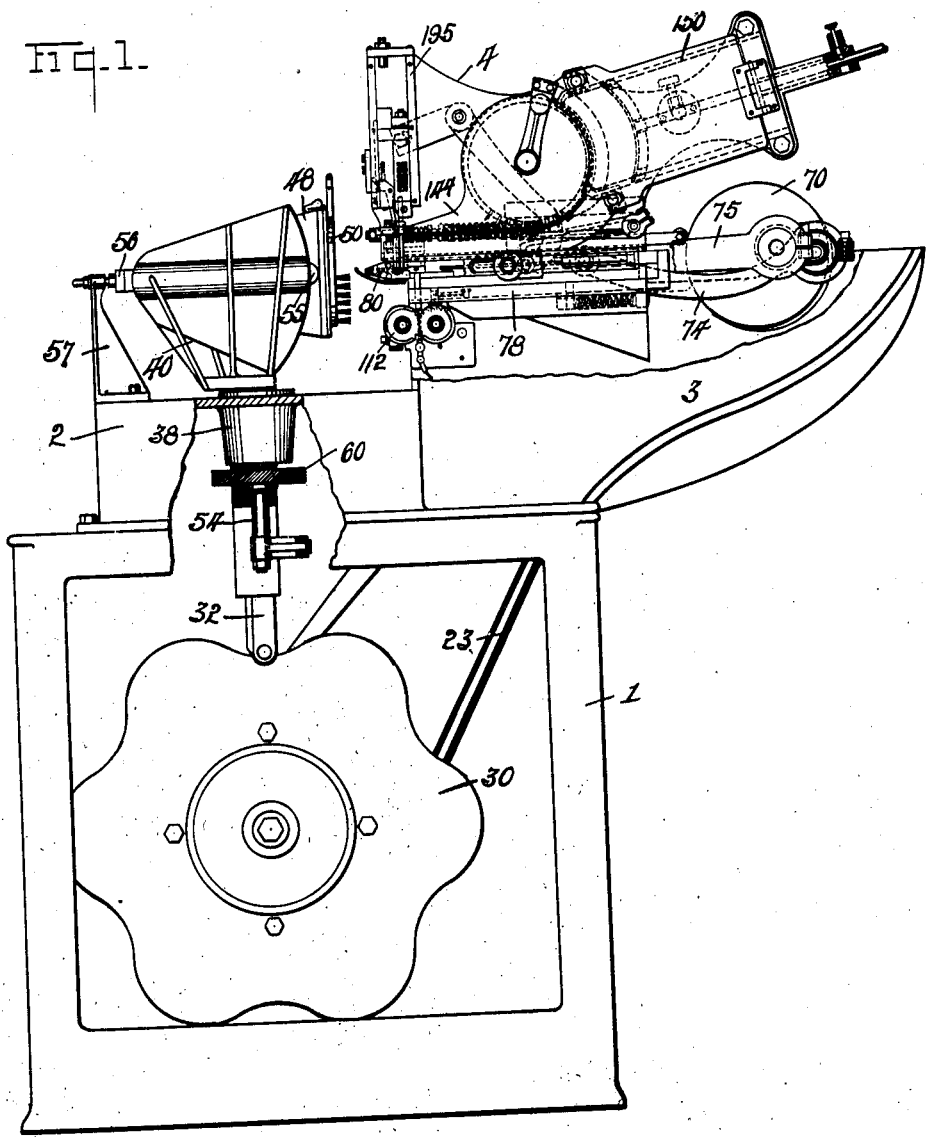

April 3, 1928.

C. JOBST 1,664,420

BRUSH MAKING MACHINE

Filed Jan. 19, 1921

13 Sheets-Sheet 1

INVENTOR
Conrad Jobst,
By Owen Owen & Crampton,
His attys.

April 3, 1928.  
C. JOBST  
1,664,420  
BRUSH MAKING MACHINE  
Filed Jan. 19, 1921  
13 Sheets-Sheet 3

INVENTOR
Conrad Jobst
By Owen Owen & Asmyton
His attys.

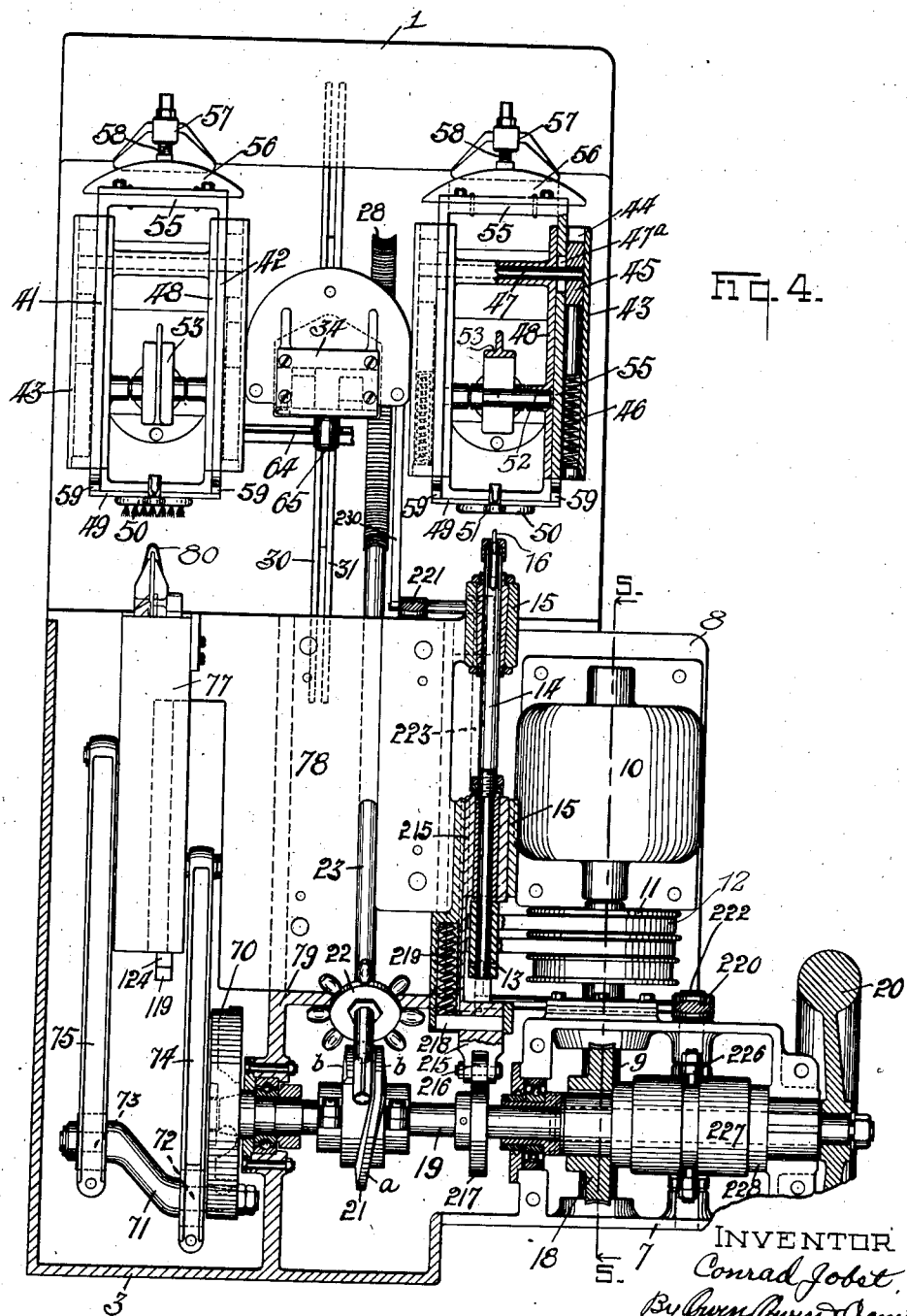

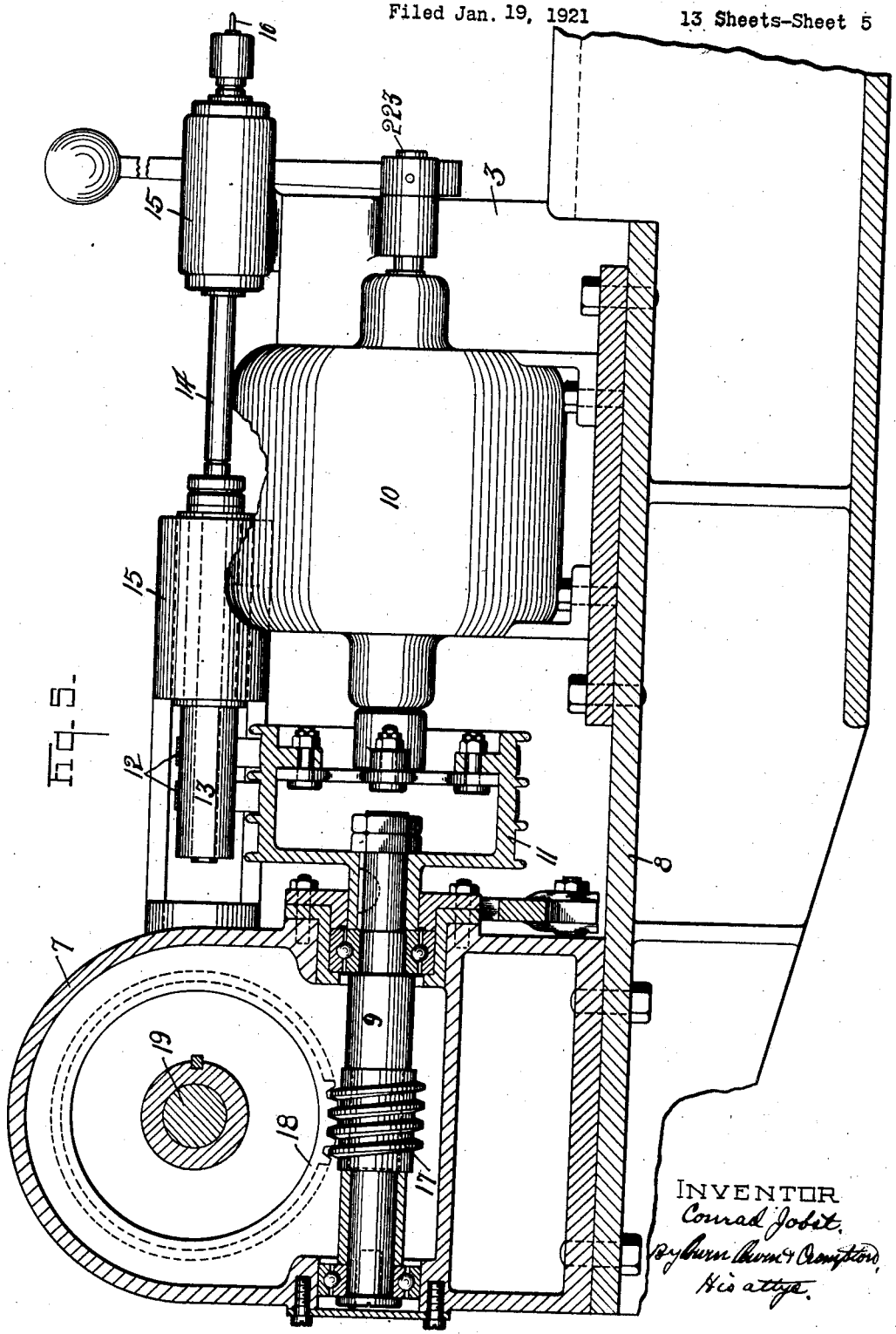

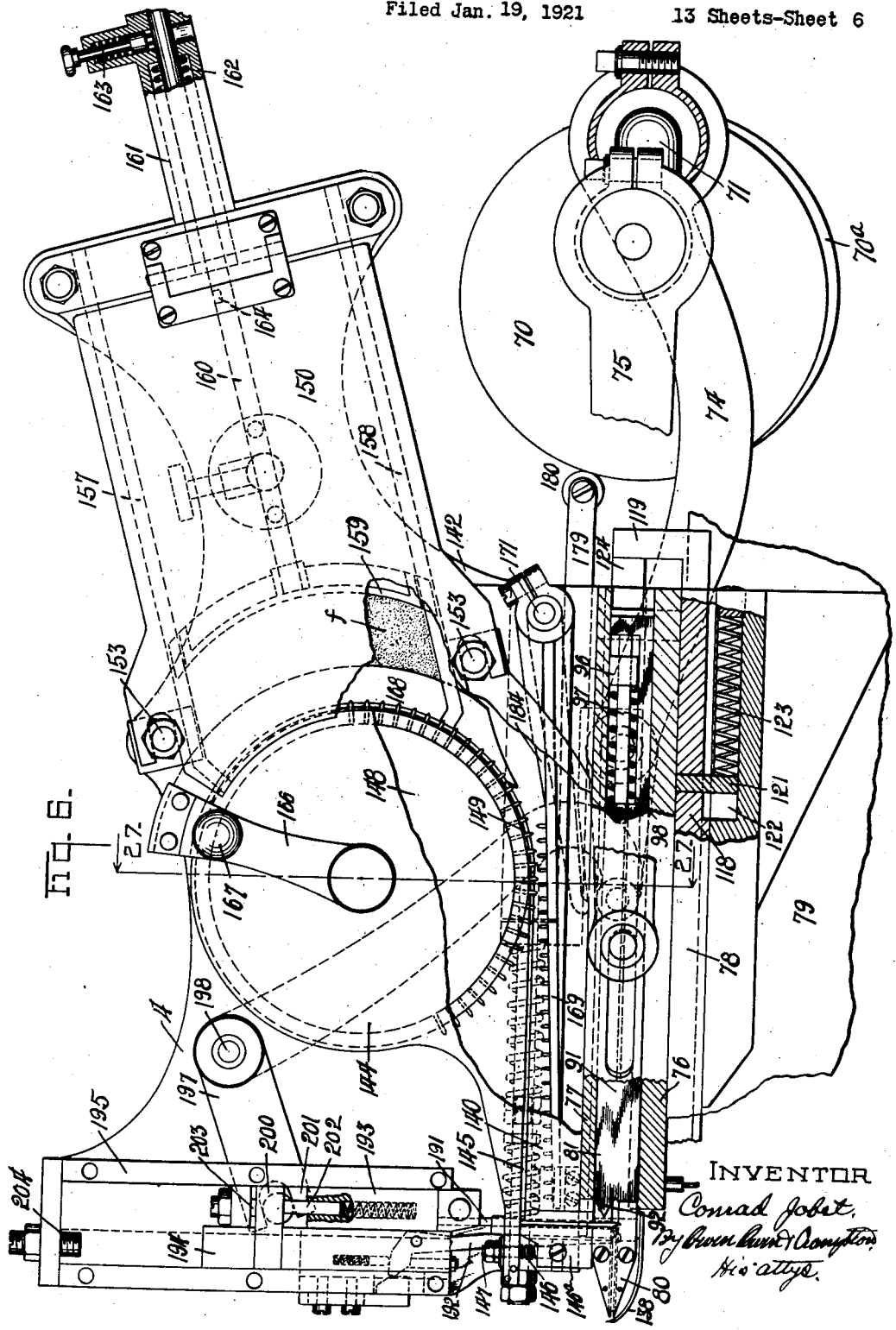

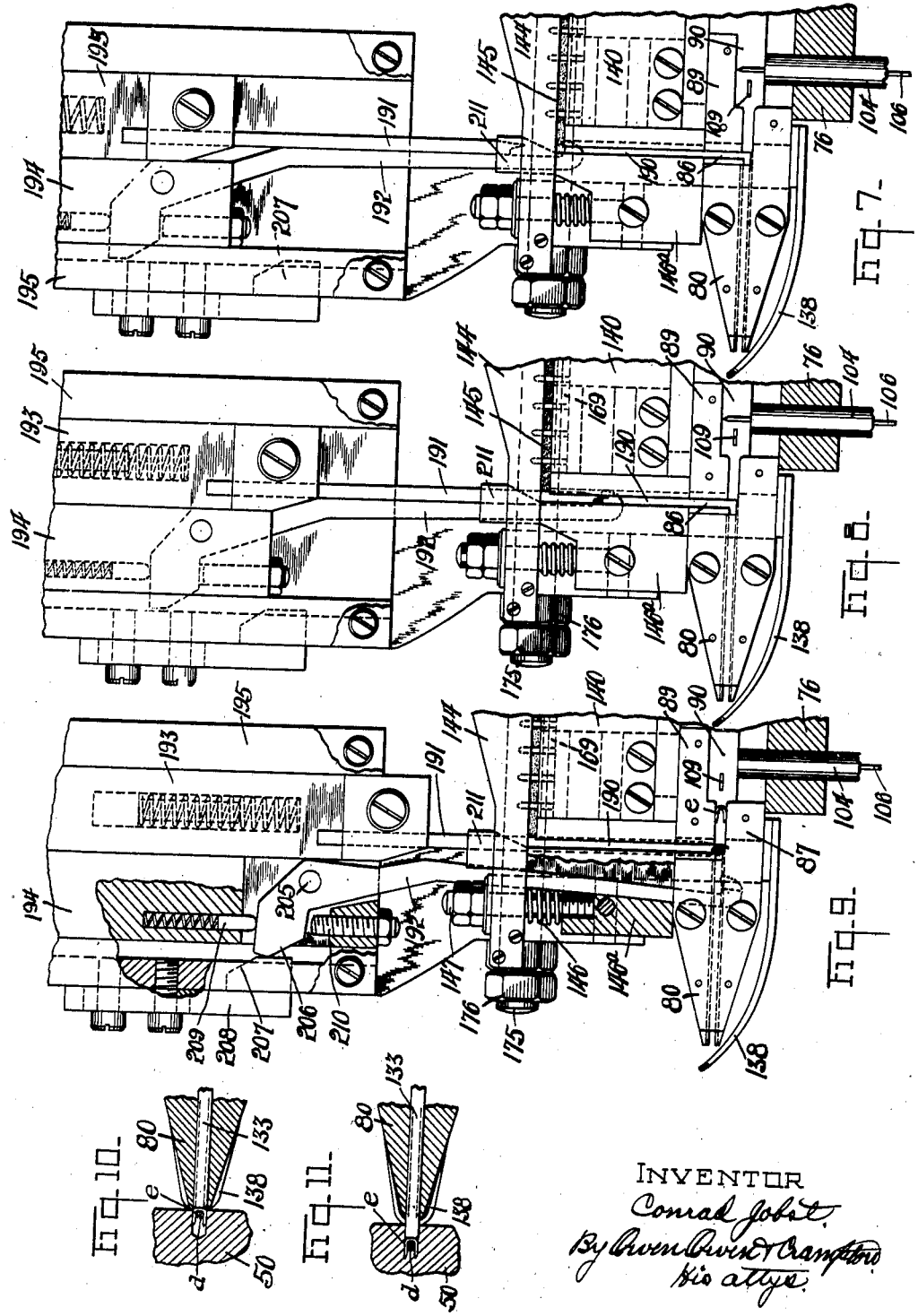

April 3, 1928.
C. JOBST
1,664,420
BRUSH MAKING MACHINE
Filed Jan. 19, 1921     13 Sheets-Sheet 8
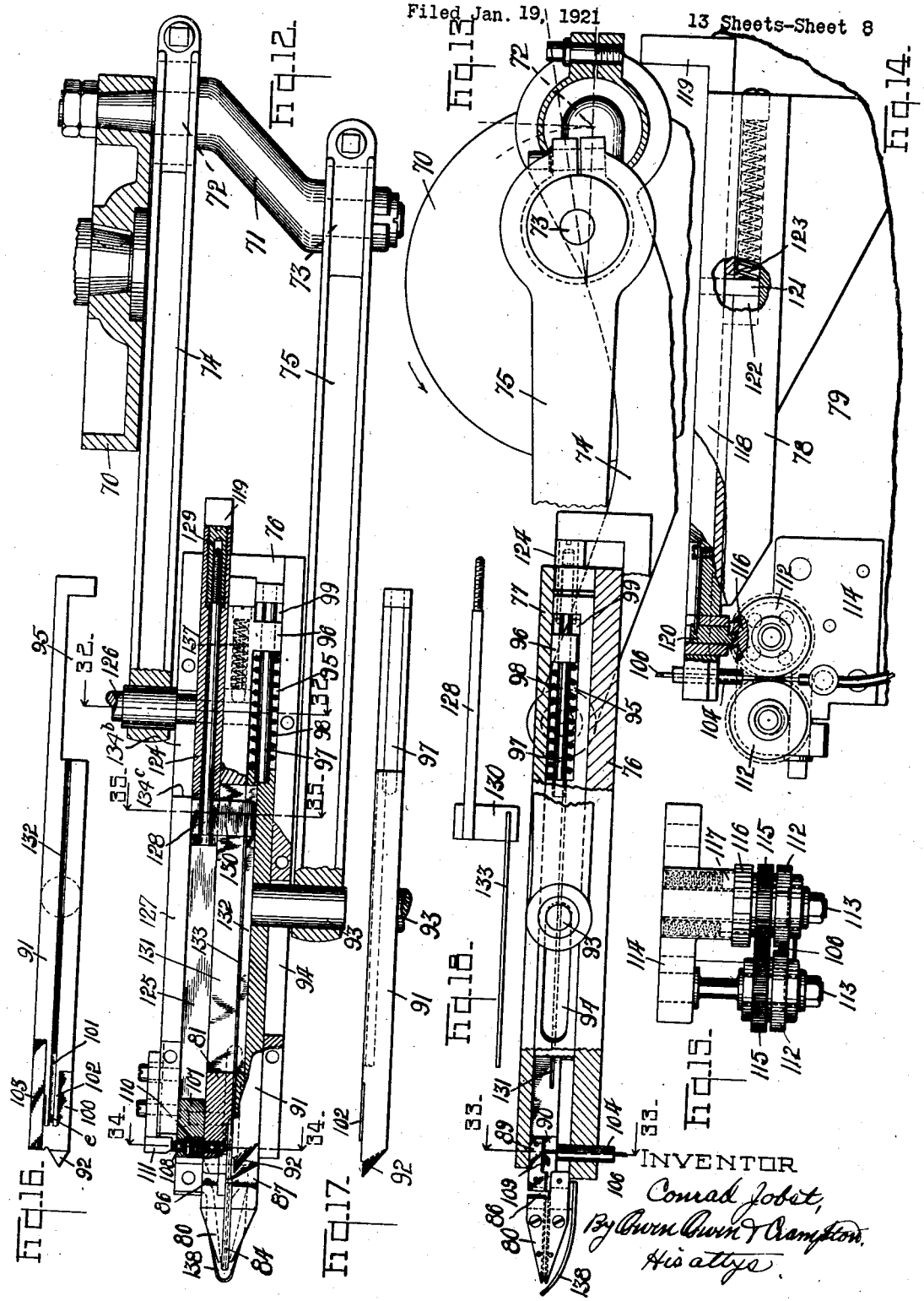
INVENTOR
Conrad Jobst,
By Owen Owen & Crampton
His attys.

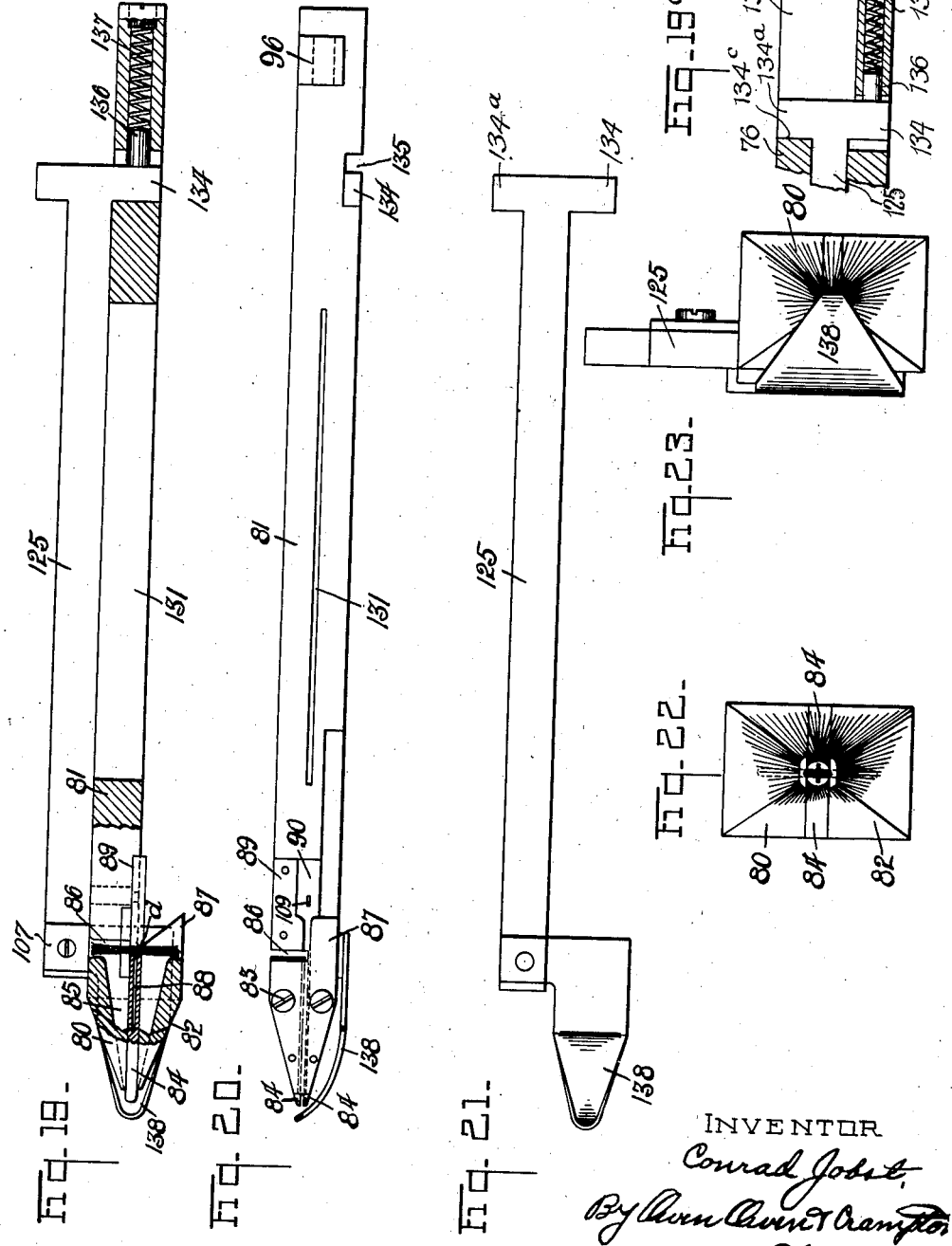

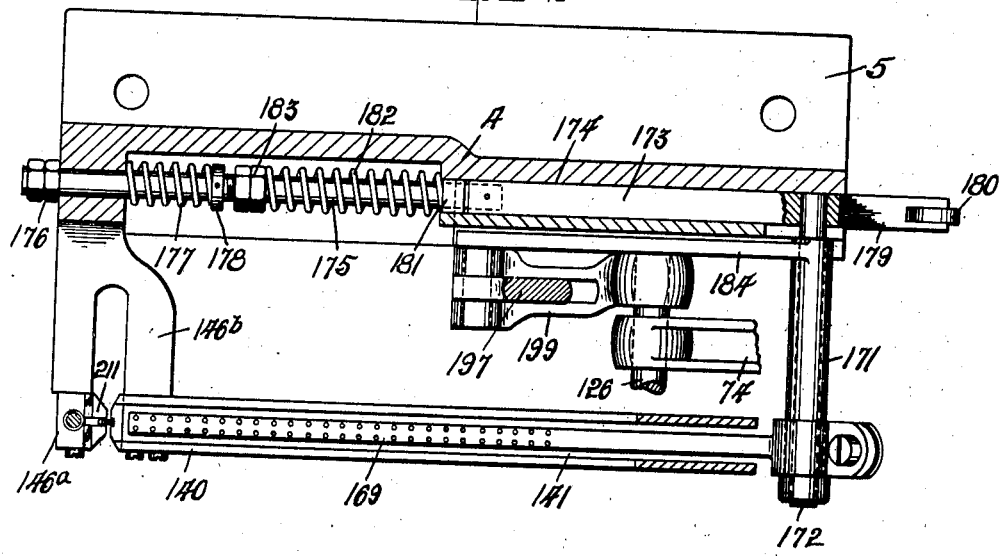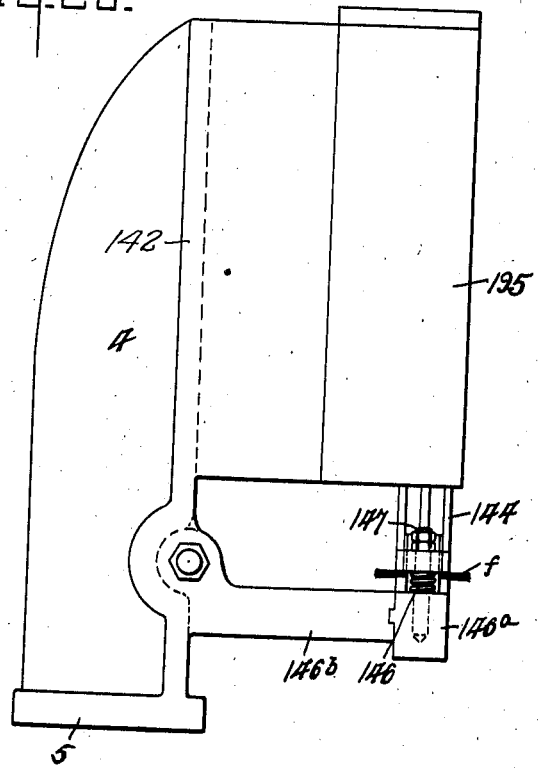

April 3, 1928.
C. JOBST
1,664,420
BRUSH MAKING MACHINE
Filed Jan. 19, 1921
13 Sheets-Sheet 11
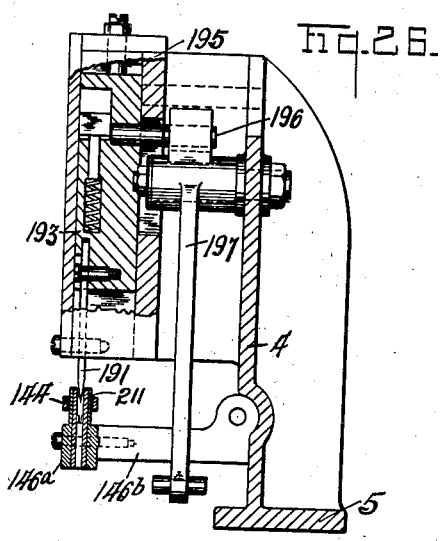
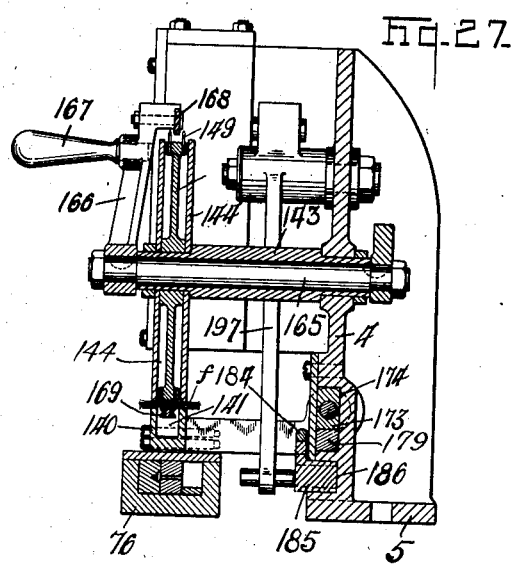
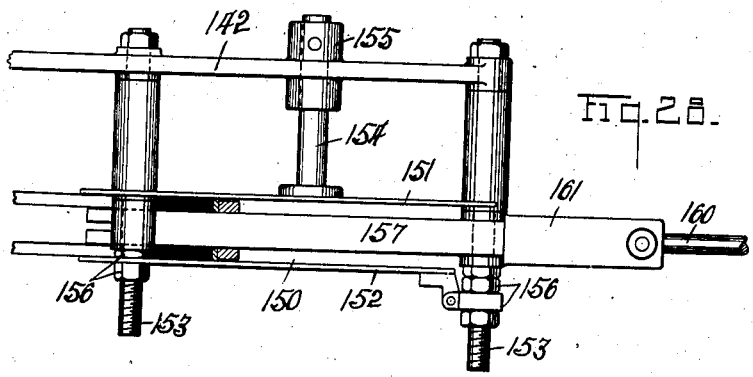
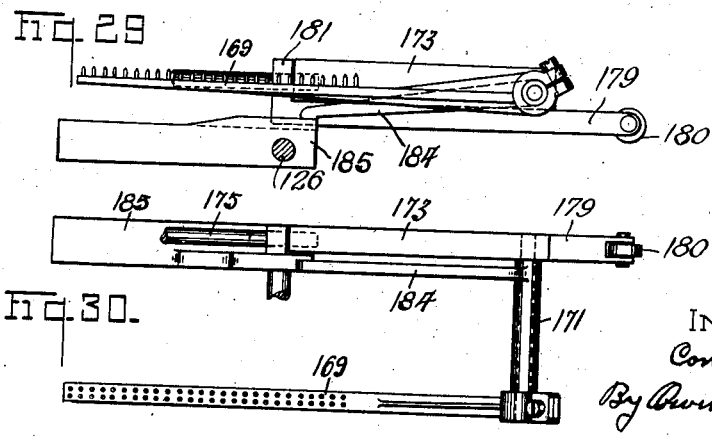
INVENTOR
Conrad Jobst.
By Owen Owen & Crampton
His attys.

April 3, 1928.
C. JOBST
1,664,420
BRUSH MAKING MACHINE
Filed Jan. 19, 1921    13 Sheets-Sheet 12
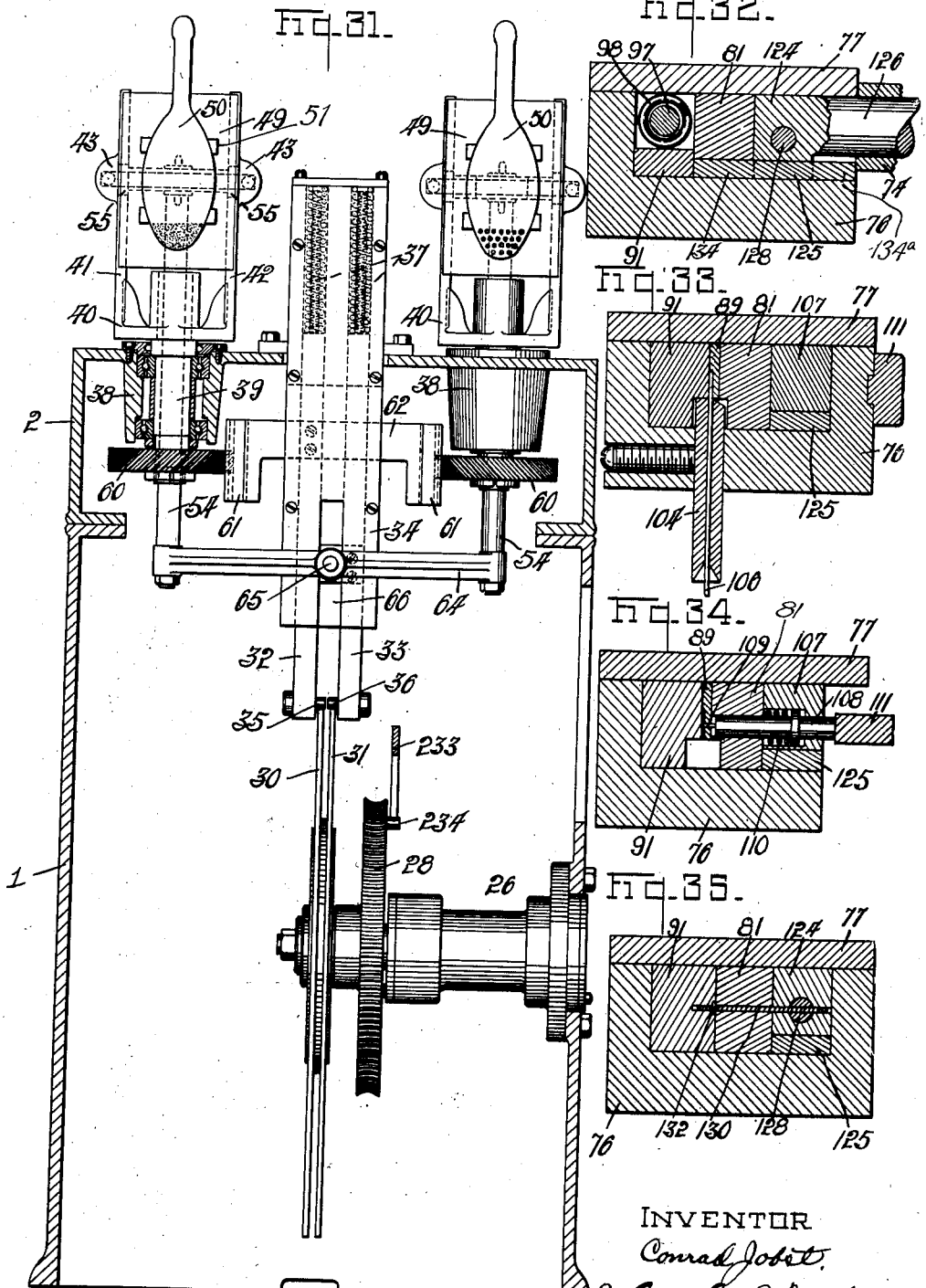
INVENTOR
Conrad Jobst
By Owen Owen & Crampton
His attys April 3, 1928.
C. JOBST
1,664,420
BRUSH MAKING MACHINE
Filed Jan. 19, 1921
13 Sheets-Sheet 13
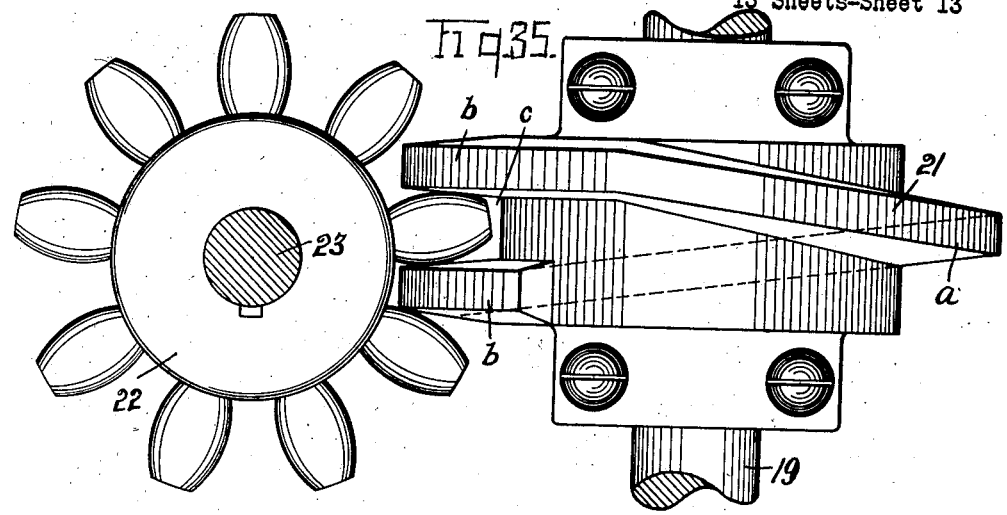
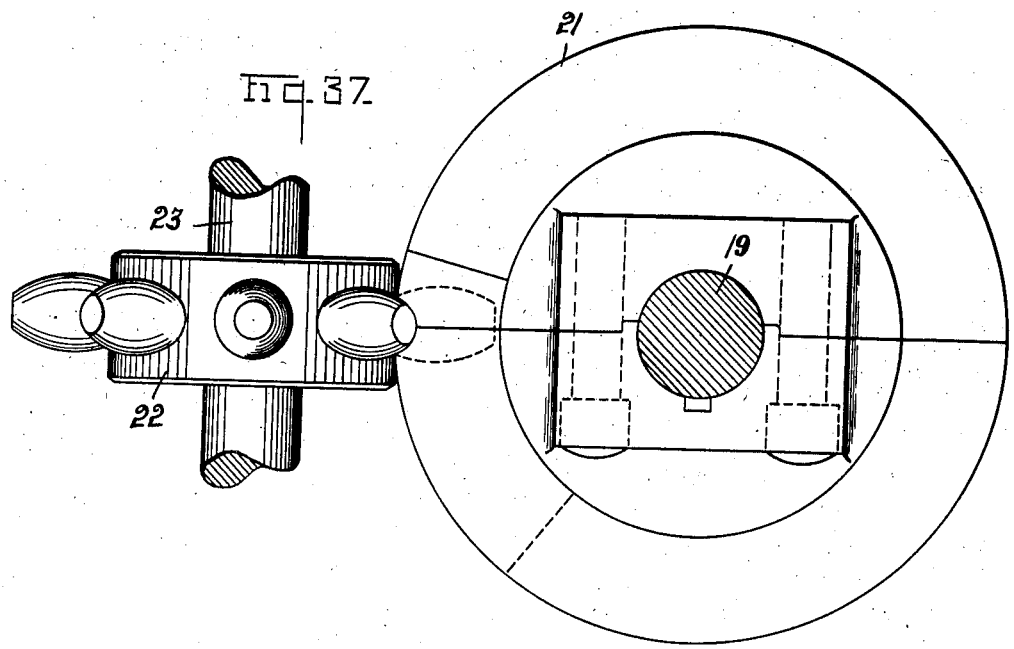
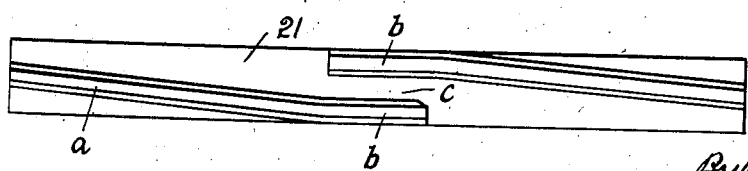
INVENTOR
Conrad Jobst,
By Owen Owen & Compton
His attys.

Patented Apr. 3, 1928.

1,664,420

UNITED STATES PATENT OFFICE.

CONRAD JOBST, OF TOLEDO, OHIO, ASSIGNOR, BY MESNE ASSIGNMENTS, TO THE TOLEDO AUTOMATIC BRUSH MACHINE COMPANY, OF TOLEDO, OHIO, A CORPORATION OF OHIO.

BRUSH-MAKING MACHINE.

Application filed January 19, 1921. Serial No. 438,391.

This invention relates to brush making machinery and particularly to that type of machines adapted to bore brush backs and set bristle tufts therein. This application relates particularly to the tuft setting mechanism of the brush making machine. Other features of the mechanism hereinafter described and illustrated in the drawings but not claimed herein form the subject matter of the co-pending applications, Serial No. 527,590, filed January 7, 1922, entitled Brush machine; Serial No. 527,589, filed January 7, 1922, entitled Tuft forming mechanism; and Serial No. 527,591, filed January 7, 1922, entitled Work holders for brush machines.

The object of my invention is the provision of an original, novel and highly efficient machine of the character described which is operable to successively feed bristle tufts to and insert and anchor them in the holes of a previously bored brush back.

A further object of my invention is the provision in a machine of the class described, of simple and novel means for carrying a brush back and to move it to predetermined successive positions for boring or filling. A further object of my invention is the provision in a machine of the character described, of comparatively novel and simple mechanism for successively taking tufts of bristles from a magazine, feed them to the setting head, then doubling the tufts upon themselves and forcing them into registering receiving holes together with an anchoring means.

Further objects and advantages of the invention will be apparent from the following detailed description thereof,—

While the invention in its broader aspect is capable of embodiment in numerous forms, a preferred embodiment thereof is illustrated in the accompanying drawings, in which,—

Figure 2:
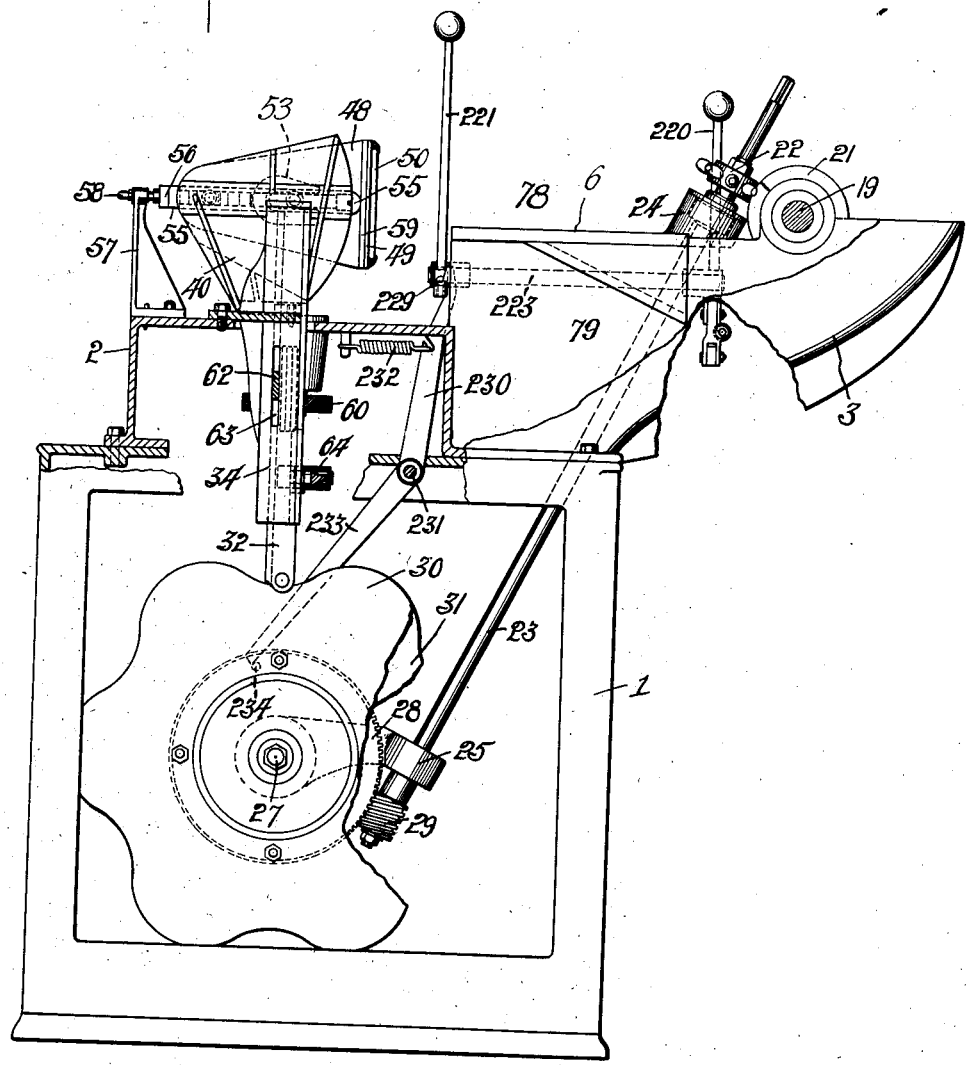
Figure 3:
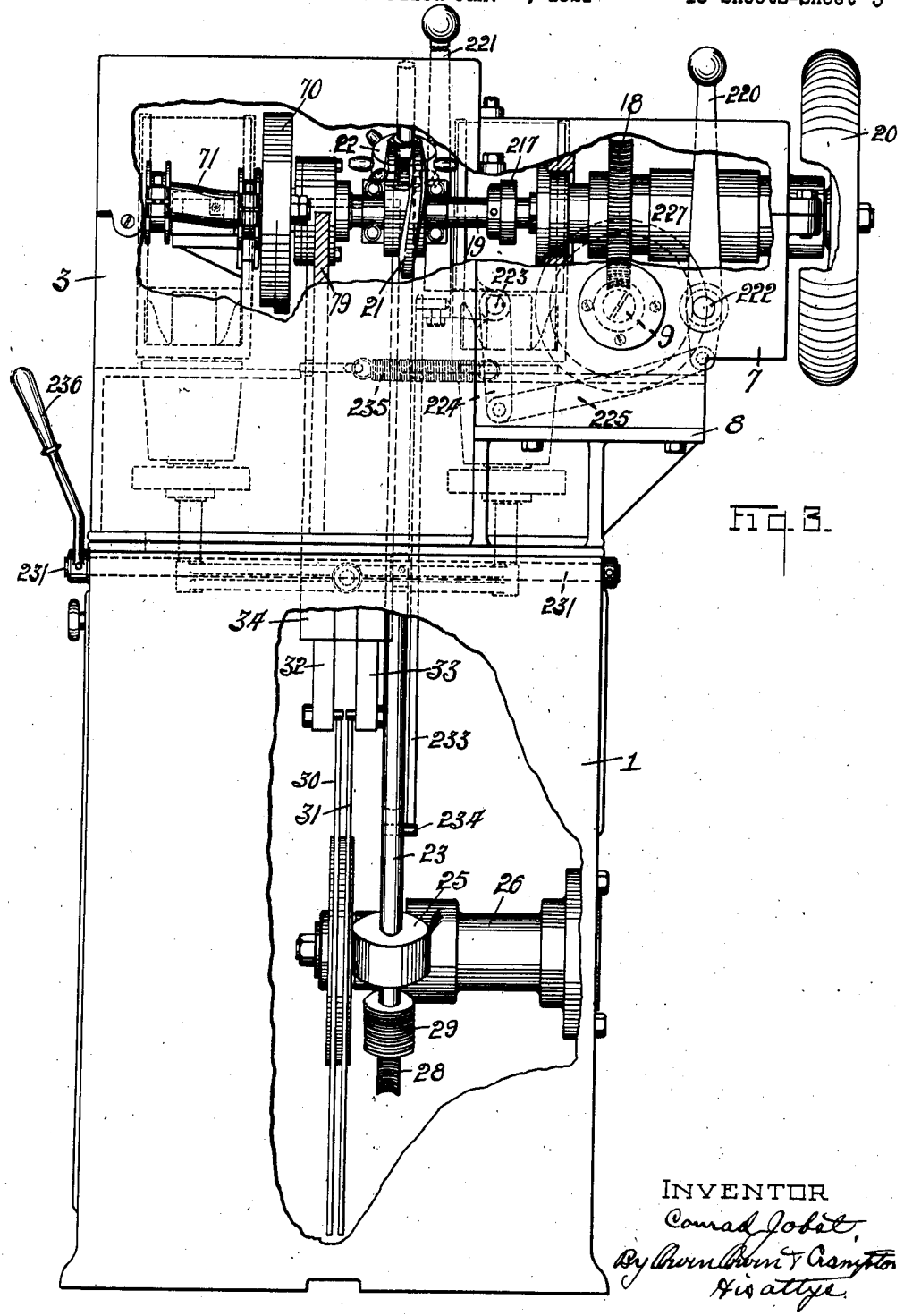

Figure 1 is a front elevation of a machine embodying the invention with parts broken away and parts removed. Fig. 2 is a similar view thereof with a part of the tuft feeding and setting mechanism removed, and other parts broken away. Fig. 3 is an enlarged elevation of the right side of the machine with a part of the bristle tuft feeding and setting mechanism removed. Fig. 4 is an enlarged top plan view of the machine with parts broken away and with a part of the bristle tuft feeding and setting mechanism removed. Fig 5 is an enlarged fragmentary section on the line 5—5 in Fig. 4, with parts in full. Fig. 6 is an enlarged front elevation of the bristle tuft feeding and setting mechanism, with parts broken away and parts removed. Figs. 7, 8 and 9 are enlarged fragmentary views thereof with the stock separating needles in different successive positions of their movement. Fig. 10 is an enlarged sectional detail of a portion of the bristle setting means showing the relative positions of the driving plunger and nozzle head at the initial driving point. Fig. 11 is a similar view showing the relative position of the driving plunger and nozzle head at the completion of the driving movement. Fig. 12 is an enlarged fragmentary top plan view of a part of the driving and setting means. Fig. 13 is an enlarged fragmentary side elevation thereof. Figs. 14 and 15 are different views of the staple wire feeding means. Figs. 16 and 17 are different views of one of the staple guiding and forming members. Fig. 18 is a plan view of the staple driving plunger. Fig. 19 is a top view of the nozzel head and its carrying bar together with the spring guard tongue, with parts broken away. Figure 19ᵃ is a sectional plan view showing the position of the slide 125 when the nozzle head has completed its forward reciprocation. Fig. 20 is a side elevation thereof. Fig. 21 is a plan view of the guard tongue. Fig. 22 is an outer end view of the nozzle head. Fig. 23 is a similar view with the spring guard tongue in position. Fig. 24 is a longitudinal section showing the bristle feeding comb. Fig. 25 is a left side view of the frame part enclosing the operating mechanism for the bristle tuft separating needles. Fig. 26 is a sectional right side elevation of said frame and operating means with parts broken away. Fig. 27 is a vertical section on the dotted line 27—27 in Fig. 6, with parts removed and with the bristle separating knife carrying arm in advanced position. Fig. 28 is a top view of the stock magazine. Figs. 29 and 30 are side and plan views of the bristle feeding comb and the means for controlling the raising and lowering movements thereof. Fig. 31 is an enlarged elevation of the brush back holding heeds and control means therefor, with the frame and other parts in section. Figs. 32, 33, 34 and 35 are different enlarged sections taken through the bristle tuft setting and staple forming and driving means, respectively, on the lines 32—32, 33—33, 34—34 and 35—35 in Figs. 12 and 13. Figs. 36 and 37 are different enlarged detail views of the intermittent worm drive employed for driving the actuating cams for the brush back carrying heads, and Fig. 38 is a diagram of the worm member laid out in a straight plan.

Referring to the drawings, 1 designates a hollow base portion of the machine frame on the top of which is mounted a table portion 2 having at one side thereof the elevated hollow frame part 3 on which a bracket head or frame part 4 is mounted. This latter frame part is provided with a base 5 (Figs. 24 to 27) which rests upon and is bolted to the top 6 of the frame part 3. The frame part 3 has a rear extension or housing 7. This housing has a shaft 9 (Figs. 3 and 5) journaled therein lengthwise of the frame and connected at one end to a motor 10, which is mounted on a frame part 8 at the left of the housing 7, the connection of the shaft with the motor shaft, in the present instance, being through a pulley 11. This pulley is connected by one or more belts 12 with a pulley 13 on the boring spindle shaft 14, which is journaled in bearings 15 on the rear side of the frame part 3 and extends longitudinally of said frame part. The outer or left hand end of the shaft 14 extends over the frame part 2 and carries a boring tool 16 in position to bore bristle receiving holes in a brush back, as hereinafter described.

A worm 17 is provided on the shaft 9 within the housing 7 and meshing with a superposed worm-wheel 18 on a shaft 19, which is journaled in the housing 7 and hollow frame part 3 transversely thereof, or in forwardly and rearwardly extending position. The shaft 19 at its rear end projects without the housing 7 and carries a hand-wheel 20, and is provided within the housing 3 with an intermittent drive worm 21, the thread of which (Figs. 3, 36, 37 and 38) has a spiral portion a extending in the present instance, slightly over three-fourths of the distance around the worm, and has its lapping portions b, b at right angles to the shaft so that a neutral groove or space c is provided therebetween. The worm 21 acts on a pin-wheel 22 to impart an advancing movement to the wheel when one of the pins thereof is in engagement with the rotating spiral portion a of the worm and to cause the wheel to stand at rest when a pin is traversing the neutral space c thereof.

A succeeding pin or tooth of the wheel is engaged by the worm at each succeeding revolution thereof.

The pin wheel 22 is carried by an inclined shaft 23 (Figs. 2 and 3), which is journaled at its upper end in a bearing 24 in the top portion of the frame part 3 and at its lower end in a bearing arm 25 projecting laterally from a bearing bracket 26 in the frame base 1. A horizontal shaft 27 is journaled in the bracket 26 and carries a worm wheel 28 in mesh with a worm 29 on the shaft 23, and also carries two cam-wheels 30 and 31. It is thus evident that at each revolution of the intermittent drive worm 21, a slight feeding movement is imparted to the cam-wheels 30 and 31. Two bars 32 and 33 are mounted over the cam wheels 30 and 31 for vertical reciprocatory movements in a guide 34, which is fixed to the frame part 2 and extends from above the top of the same down into said frame part, as best shown in Fig. 31. The bar 32 has a pin or roller 35 at its lower end resting on the periphery of the cam wheel 30, and the bar 33 has a pin or roller 36 at its lower end resting on the periphery of the cam-wheel 31 so that at each rotation of a cam wheel, the slide bar in engagement therewith has reciprocatory movements imparted thereto in accordance with the peripheral cam formation of the wheel, which of course depends upon the pattern of the brush back to be bored or filled, as well understood in the art. The bars 32 and 33 are yieldingly held against the wheel peripheries by coiled springs 37 acting thereagainst in the upper end portion of the guide.

The frame part 2 is provided in its top, both at front and rear of the guide 34 with vertical bearings 38 in each of which is mounted a vertical shaft 39 (Fig. 31) for horizontal rocking movements. A head 40 is carried by each shaft 39 above the top of the frame part 2 for horizontal rocking movements therewith and is of U-form, having the front and rear sides 41 and 42 projecting upward therefrom. Each side of the head 40 is provided at the outer side thereof adjacent to its top, in the present instance, with a hollow horizontally disposed enlargement 43 extending longitudinally thereof and forming a guideway or socket 44 (Fig. 4) lengthwise thereof in which a slide block 45 works. A coiled compression spring 46 is disposed between the forward or inner end of the socket 44 and the adjacent end of the block 45 to normally urge a movement of the latter toward the outer end of the head 40. The blocks 45 carried by opposite sides of a head 40 are connected by a shaft 47.

A vertical rocker-frame 48 of reclining U-form is fitted between the sides of the head 40 for vertical movements therebetween and is mounted at its rear or inner end for vertical rocking movements on the shaft 47. The closed end of the rocker frame 48 is disposed at the forward or outer end of the head 40 and is flat to adapt it to carry at its outer side a plate 49, which projects at its side edges beyond the sides of the frame 48 and forms a backing plate for a brush back 50 to be operated on. Such back is secured to the plate by clamps 51, or in any other suitable manner. The frame 48 is provided intermediate its front end and the shaft 47 with a cross-pin 52, which is loosely straddled by a horizontally disposed fork 53 at the upper end of a vertically reciprocatory rod 54, which projects loosely through the shaft 39 of the associated rocker head 40. It is thus evident that a rocking movement of the shaft 39 will impart a corresponding horizontal rocking movement to the head 40 and that a longitudinal reciprocatory movement of the rod 54 will impart a vertical rocking movement to the rocker-frame 48, such rocking movement of the frame being accomplished at any position of rocking movement of the head, as is apparent.

A thrust yoke 55 of the U-form has its cross or looped portion disposed at the outer end of the head 40 and has its legs mounted in recesses in the inner surfaces of the respective sides 41 and 42 of the rocker head for free horizontal reciprocatory movements lengthwise thereof. The thrust yoke 55 is disposed in the horizontal plane of the rocker frame pivot 47 and removably carried thereby is the bar 56 having an arcuate outer bearing surface extending transversely of the head. A standard 57 rises from the top of the frame part 2 at the outer end of the yoke 55 and carries an adjustable bearing stud 58 at its upper end in thrust contact with the curved bearing surface of the bar 56.

The brush back carrying plate 49, on the forward or inner end of the frame 48, extends at its side edges beyond the sides of the frame in position to carry vertically disposed templet bars 59 for rearward thrust bearing contact with the curved forward ends of the legs of the thrust yoke 55. It is evident that the springs 46 act on the plunger 45 and shaft 47, carrying the rocker frame 48, to normally retain the templet bars 59 in thrust bearing contact with the respective legs of the yoke 55, and that said templet bars slidingly ride on the ends of the yoke legs during any vertical rocking of the frame 48. If the face of the brush back 50 to be bored or filled is flat then the bearing surfaces of the templet bars are flat, and if such face is curved in a vertical plane then the leg coacting faces of the templet bars should be curved in conformance therewith. The curved bearing surface of the cross bar 56 is formed by intersecting the vertical rocking axis of the frame 40 with lines of equal length extending from different points on a line disposed cross-wise of the front face of the brush back 50, the rear ends of the lines defining the curve of the bar 56. It is thus evident that the curvature of the bar 56 varies for different styles of brush backs to be operated on, depending on the form of the surface thereof to be bored and filled. If such surface of the brush back is of convexed form crosswise thereof the curve decribed by the bearing surface of the bar 56 will be of greater diameter than if such surface is of flat form. It is evident that the thrust of a boring or filling tool against a brush back carried by a rocker frame 48 is distributed to the legs of the yoke 55 through the templet bars 59 and then in a direct horizontal plane against the bearing stud 58 through the cross bar 56, the direct line of thrust of the boring tool 16 in one case, and the tuft setting means in the other case, on the brush back being in the horizontal plane of the yoke 55. The bearing stud 58 is adjustable in the standard 57 to suit the curvature of the thrust bearing bar 56.

Each shaft 39 carries at its lower end a helical gear 60 in mesh with a respective vertical helical rack 61 carried at different ends of a cross-bar 62 fixed, in the present instance, to the vertical reciprocatory bar 32 for movements therewith. The cross-bar 62 projects transversely through a guide slot 63 (Fig. 2) in the guide 34. It is thus evident that vertical movements of the bar 32 impart predetermined horizontal rocking movements in unison to the heads 40. The vertically reciprocatory bar 33, in the present instance, carries a cross-arm 64 connected at its outer ends to the lower ends of the respective rods 54 to communicate vertical reciprocatory movements of said rods from vertical movements of the bar 33. The cross-arm 64 is attached to the bar 33 through the medium of a bracket stud 65 projecting laterally and forward from said bar through a slot 66 in the guide 34.

The shaft 19 is provided at its forward end within the front portion of the frame housing or part 3 with a crank-wheel 70 (Figs. 3, 4, 12 and 13), the wrist-pin 71 of which is angled and provided with longitudinally spaced connecting rod journals 72 and 73, which are laterally offset with respect to each other and with respect to the crank-wheel axis, with both at the same side thereof. Connecting rods 74 and 75 project forward or inward toward the inner end of the frame part 3, from the respective wrist-pin journal portions 72 and 73 and have their forward ends disposed at opposite sides of a guide frame 76, which is rectangular in cross-section and provided with a removable cover 77. This guide frame is fixedly mounted on the top 78 of the frame part 3 in substantially the horizontal plane of the rocking axis 47 of the brush back carrying frame 48.

The filling nozzle 80 of the machine is carried at the forward end of a bar 81 that is mounted for longitudinal reciprocatory movements in the guide 76. This nozzle is of tapered or pyramidal form, and is formed in two parts, the part to one side of its longitudinal center being integral with the bar 81, and the other part comprising a block 82, which is secured to the side of the bar 81 at the nozzle portion thereof by screws 83, or in any other suitable manner, and the two parts bear at their inner sides against a pair of upper and lower narrow guide strips 84 interposed therebetween. The guide strips 84 are longitudinally aligned with the adjacent or inner side face of the bar 81 and have their inner or adjacent edges vertically spaced. These guide strips project at their forward ends a slight distance beyond the nose of the side portions of the nozzle between which they are disposed, and they cooperate with said side portions to form a discharge opening 85 for the bristle tufts, which opening is shallow in depth and horizontally broadened at its rear end, being gradually reduced in width forwardly therefrom to a restricted discharge orifice at the nose of the nozzle, which orifice is of approximately the width of the guide strips 84, as best shown in Figure 19. The nozzle is provided in its top at the rear end portion thereof with a transverse recess 86, which extends to the bottom and communicates with the rear end of the tapered discharge opening 85 of the nozzle so that tufts of bristles $d$ may be fed down into the recess 86 into register with the rear end of the nozzle opening 85 in position to be forced therein and doubled upon themselves, as hereinafter described. The rear end of the nozzle block 82 has a tapered tail piece 87 extending outward and rearward from the inner side of the bar 81 in register at its top with the bottom of the recess 85. The guide strips 84 have their inner edges each provided with longitudinally extending grooves 88, which grooves are intended to form guide ways for a staple setting plunger and also for the legs of a staple driven by the plunger, as hereinafter described. The depth of each guide groove 88 for this purpose is substantially equal to the cross section of a wire forming the staple. A plate 89 is secured to the inner side of the nozzle bar 81 immediately at the rear of the recess 86, in longitudinal alignment with the guide strips 84, and has a longitudinally extending recess 90 in its outer side which is vertically broadened at its rear end for a predetermined distance and has its forward end portion vertically narrowed to substantially the combined depth of the nozzle opening 85 and guide grooves 88.

A staple forming and cutting bar 91 (Figs. 12, 16 and 17) is mounted in the guide 76 at the inner side of the nozzle-bar 81 in side contact therewith, and in longitudinal alignment with the laterally projecting nozzle-block 82. The bar 91 is intended to have limited longitudinal movements relative to both the guide 76 and nozzle-bar and has its forward end provided with a tapered nose 92, which, when the bar 91 is at the limit of its forward movement projects at its point across the base portion of the recess 86 in spaced relation to its bottom. The purpose of the bar nose 92 is to pass over a bristle tuft $d$, which has been disposed in the recess 86, and hold the tuft intermediate its ends, in compact form after being released by the stock separating needles and until straddled by a staple, as hereinafter described.

A stud 93 projects from the outer side of the bar 91 through a longitudinally extending slot 94 in the adjacent side of the guide 76, and this stud is connected to the wrist-pin 73 of the operating crank by the connecting bar 75, so that reciprocatory movements are imparted to the bar 91 from a revolution of the crank shaft 19. The bar 91 is provided in its rear end portion with a notch or recess 95, which is elongated longitudinally of the bar, and a lug 96 projects from the nozzle-bar 81 into this recess. A rod 97 extends lengthwise of the recess 95 with its ends mounted in the end walls thereof. This rod projects loosely through the lug 96 and is encircled by a coiled compression spring 98 disposed between the lug and forward end wall of the recess with its opposed ends thrust thereagainst.

The nozzle-bar 81 is actuated from movements of the bar 91, and during a rearward stroke of the bar 91 the spring 98 yieldingly acts against the lug 96 to move the nozzle bar rearward until its rear end strikes the rear end of the guide 76, thereby stopping its movement and permitting the bar 91 to finish its rearward stroke alone, which creates a space 99 between the lug 96 and rear end wall of the recess 95. The length of the space 99 is the same as the length of movement of the bar 91 rearward from the nozzle block 82. The bar 91 is provided in the forward end of its upper edge portion at its inner side with a recess 100 for receiving the rear end portion of the nozzle-bar plate 89, which overhangs the recess 90 thereof. A groove 101 is provided in the inner face of the bar 91 lengthwise thereof and the forward end portion of this groove terminates in a narow portion 102 of the bar face, which is intended to project and have movements in the recess 90 of the nozzle-bar plate 89 when the bars 81 and 91 are relatively moved.

The portion 102 is formed by recessing the face of the bar 91 around the upper and lower sides and forward end thereof, the upper recess being designated 100 and the lower recessed portion 103.

A staple-wire guide-tube 104 projects vertically through the bottom of the guide 76 adjacent to its forward end (Figs. 7, 8 and 9) and extends at its upper end into the recess 103, which is formed partly in each of the adjacent sides of the bars 81 and 91. The tube 104 terminates at the base of the recess 90 in the nozzle-bar-plate 89 in position for the portion 102 of the bar 91 to pass thereover in wire shearing coaction therewith when the bar 91 is moved forward relative to the nozzle-bar, thereby effecting a shearing off of a length of the wire 106 which has been fed up into the recess 90.

The nozzle-bar 81 is provided on the outer side of its forward end portion with a block or lateral enlargement 107, and extending transversely through this and into the nozzle bar is a plunger 108. This plunger terminates at its inner end adjacent to the bar plate 89 and has, at such end, an anvil 109 which projects through the plate 89 into the broadened portion of the recess 90 in advance of the line of feeding of a length of wire 106 into the recess. A spring 110 acts on a shoulder of the plunger (Fig. 34) to normally retain the anvil 109 retracted from within the recess 90. When the nozzle-bar is at the limit of its rearward movement the plunger 108 is engaged at its outer end by a cam block 111 at the forward end of the guide 76 and is held inward thereby with its anvil projecting into the recess 90 in staple forming position. It is thus evident that upon an initial forward movement of the bar 91, relative to the nozzle-bar 81, the portion 102 of the bar 91 will first coact with the upper end of the guide 104 to sever a fed length of staple wire from the wire 106 and will then force the severed wire section forward into engagement, centrally of its ends, with the registering anvil 109, which anvil then causes a looping of the wire section in U-form into the forward end of the bar groove 101 due to the advancing movement of the bar. When the bar 91 has moved the limit of its forward stroke relative to the nozzle-bar 81, the nozzle-bar will move forward therewith, and when the plunger 108 has passed from engagement with the cam-block 111 the anvil will be caused to move outward from staple obstructing position to permit an ejection of the staple from the nozzle, as hereinafter described.

The restricted forward end portion of the recess 90 is substantially the same in width as the staple forming groove 101, and when the bar 91 is at the limit of its forward movement relative to the nozzle bar, the forward end of the groove 101 will be in close register with the restricted end of the recess 90 to permit the formed staple e to pass from one to the other.

The feeding means for the staple wire 106 comprises a pair of opposed feed rolls 112, which are mounted on respective studs 113 projecting outward from a bracket plate 114, which is secured to the frame partition 79 below the forward end of the guide 76. A pair of pinions 115 are fixed to the hub portions of the wheels 112 and mesh to cause the wheels to rotate in unison. To the hub portion of one of the wheels 112 is also fixed a ratchet wheel 116. A turning of the feed-wheels is resisted by one or more spring pressed plungers 117 which are mounted within the bracket plate 114 and bear outward against the ratchet 116. A feed-bar 118 is mounted in the frame top 78, and extends at its rear end beyond the rear end of the guide 76 and terminates in an upturned finger 119. The forward end of the feed-finger 119 carries a spring pressed pawl 120 for vertical reciprocatory movements and with its lower end projecting below the feed-bar in position to engage the teeth of the ratchet-wheel 116 during each rearward movement of the bar, and to thereby impart a predetermined wire feeding movement to the feed-wheels 112. The feed-bar 118 has a pin 121 projecting downward therefrom into a longitudinally extending recess 122 in the frame top 78 and in engagement with the forward end of a coiled compression spring 123 in said recess. The spring 123 normally acts to force the feed-bar forward. A plunger 124 is mounted for reciprocatory movements between the outer side of the nozzle-bar 81 and adjacent side of the guide 76, and rests at its under side on a slide bar 125 disposed in the bottom portion of the guide 76 at the outer side of the nozzle-bar 81. When the plunger 124 is near the limit of its rearward movement its rear end is intended to strike the upturned finger 119 of the feed-bar 118 and impart a wire feeding movement thereto against the tension of the spring 123. The plunger 124 has a cross-pin or shaft 126 extending outward therefrom through a slot 127 in the respective side of the guide 76, and this pin is connected by the connecting rod 74 to the wrist-pin 72 of the operating crank 70.

A rod 128 extends into the plunger 124 and has threaded engagement at its rear end within the plunger with a socket-nut 129, whereby a longitudinal adjustment of the rod relative to the plunger can be effected by a turning of the nut. The forward end of the rod projects beyond the plunger and carries a cross-piece 130 of thin form which projects through a registering longitudinally extending slot 131 in the nozzle-bar 81 and into the registering groove 101 of the bar 91, and also into a narrower groove 132 in the base of the groove 101. A staple driving bar 133 is mounted in the groove 101 of the bar 91 for reciprocatory movements therein and is fixedly attached at its rear end to the cross-piece 130. It is therefore evident that the plunger 124 serves as the actuating means for the staple driver 133 and that said driver is connected to the plunger in laterally offset relation thereto through the medium of the cross-piece 130 and adjusting rod 128.

The driver 133 on its forward stroke forces a previously formed staple $e$ from the groove 101 in the bar 91, thence through the forward restricted end portion of the recess 90 and in straddling relation to a registering bristle tuft $d$ in the nozzle, and thence forward through the nozzle opening 85 between the guide bars 84, with the legs of the staple and edges of the driver 133 disposed in the guide grooves 88 of said bars. The nose of the driver is then projected a desired distance beyond the nose of the nozzle to enter a registering hole in a brush back and drive the staple a desired distance therein, as shown in Fig. 11. The extent of projection of the driver nose beyond the nozzle nose may be regulated by an adjustment of the rod 128 in the plunger 124. It is evident, due to the offsetting of the crank wrist-pins 72 and 73 at different distances from the crank center and the advancing of the wrist-pin 73 relative to the wrist-pin 72, that when the staple driver 133 has reached the limit of its forward stroke, the nozzle will have receded a predetermined distance from the limit of its forward stroke. In other words, when the end of the staple driver is substantially in register with the end of the nozzle the nozzle will have completed its forward stroke and will then commence to recede from its advanced position while the drive is completing its staple driving movement. This is illustrated in Figs. 10 and 11, and is a very important feature of the machine, as it prevents the injurious denting of a brush back by the nozzle during the tuft setting operation, and also provides a space between the nose of the nozzle and the outer marginal edge wall of a registering brush back opening during the setting of a bristle tuft in the opening, so that the bristles of a tuft being set will not be injuriously spread apart by the nozzle, as is the case when the nozzle remains in close rigid contact with the marginal edge wall of a brush back opening during the setting of a tuft therein.

The slide-bar 125 is provided at its rear end with a lateral projection 134 extending into a bottom recess 135 in the rear end portion of the nozzle-bar 81, and is adapted to have limited movement in said recess longitudinally of the bar. A spring pressed plunger 136 is carried by the bar 81 and acts against the rear side of the projection 134 to normally retain said projection and the slide-bar 125 at the limits of their forward movements relative to the nozzle bar. A coiled compression spring 137 is mounted at the rear end of the bar 81 and acts against the plunger 136. The slide bar 125 is also provided with a second lateral projection 134$^a$ which extends into a recess 134$^b$ in the guide housing 76 as best shown in Figure 19$^a$. At the forward end of the recess 134$^b$ is a stop 134$^c$ adapted to engage the projection 134$^a$ prior to the completion of the forward movement of the nozzle bar 81. The forward end of the slide-bar 125 projects to near the rear end of the nozzle 80 and carries an inwardly offset spring guard tongue 138, which is disposed at the under side of the nozzle and has its nose portion tapered or gradually restricted in width and extended upward and forward to a point in advance of the nozzle nose. When the nozzle is moved forward into tuft setting relation to a brush back, the guard tongue 138 is intended to deflect the bristles of a tuft previously set in the brush back so that such bristles will not be broken down or injured by the advancing movement of the nozzle. As the nozzle continues to advance after the end of the guard tongue has moved into proximity to a brush back, the lateral projection 134$^a$ will strike against the stop 134$^c$, thus arresting the forward movement of the slide 125 and the guard tongue 138. The nozzle bar 81, however, continues to advance relative to the slide bar 125, this relative movement being permitted by the compression spring 137. The guard tongue 138 is thereupon moved laterally out of obstructing relation to the nozzle nose due to the pliant nature of the tongue and as the nozzle completes its forward movement the tuft is ejected therefrom without contacting with the guard tongue.

A narrow frame 140 (Figs. 6, 24, 25 and 27) is mounted on the top of the guide 76 longitudinally thereof and forms a narrow elongated trough 141, which is substantially the length of the guide and increases in depth at its rear end. The top of the trough frame 140 is horizontal for a distance back from its forward end and then curves upward and rearward to form the front edge of the elevated portion thereof.

A frame head 4 (Figs. 26, 27) is mounted on the frame top 78 at the farther side of the guide 76 and extends lengthwise of the machine frame. A bearing-sleeve 143 fixedly projects forward from this standard over the trough frame 140 concentric to the curved top edge portion thereof. A narrow feed wheel enclosed by housing 144 which is formed of similarly shaped side plates is mounted on the sleeve 143 for rotary adjustment in a vertical plane and has its spaced side walls disposed in vertical register with the respective side walls of the frame 140. The housing 144 at its rear end is of circular form, with the sleeve 143 at its center, and has its lower forward end portion prolonged substantially in parallel relation to the trough frame. The adjacent edges of the frame 140 and housing 144 are spaced to form a narrow bristle stock feeding slot 145 therebetween. The forward ends of the frame 140 and housing 144 are yieldingly spaced apart by a coiled compression spring 146 interposed between a stationary frame block 146ª and forward end of the housing 144, and these are adjustably tied together by a bolt 147 (Figs. 6, 7, 8 and 9). The block 146ª is carried at the free end of a frame arm 146ᵇ projecting forward from the frame standard 142. It is thus evident that the depth of the bristle feed slot 145 at the forward end thereof may be enlarged or restricted as desired by merely loosening or tightning the bolt 147, the housing 144 rocking during such adjustment around the bearing sleeve 143.

A bristle feed wheel 148 is mounted for free turning movements on the bearing sleeve 143 within the frame 144, being substantially the diameter of the circular part of said housing and having two transversely spaced circumferential rows of pins 149 projecting from its periphery beyond the peripheral edge walls of the circular housing 144. It is thus evident that a rotation of the feed wheel will cause a lengthwise feeding through the slot 145 of bristle stock f disposed therein.

A magazine 150 for holding a supply of bristle stock is mounted at the rear end of the frame 144 with the forward ends of its sides lapping the outer sides of said frame, as shown in Figs. 6 and 28. The magazine extends over and rearward from the rear elevated end portion of the trough frame 140 and has its sides 151 and 152 arranged for relative adjustment, to vary their spacing, by bolts 153 projecting forward from the frame head 4. The side 151 has a stem 154 projecting from its outer side and adjustably entering a bearing 155 in the frame 4. The forward side 152 of the magazine is adjustable inward or outward by an adjustment of the nuts 156 holding the same on the respective rods 153. The magazine is provided with a top bar 157 and with a bottom bar 158. A plunger or pressure head 159 is mounted in the magazine, being carried at the forward end of a rod 160, which extends out through a guide 161 at the rear or outer end of the magazine. A coiled compression spring 162 is disposed between the pressure head 159 and guide 161 around the rod 160 and acts on the head to urge a forward movement thereof so as to maintain a yielding pressure of the pressure head against the stock f in the magazine. A spring pressed detent 163 is carried by the guide 161 and adapted to engage a notch 164 in the rod 160 to retain it in full retracted position during the time of loading the magazine. The bristle stock f is supposed to fill the space between the top and bottom bars 157 and 158 of the magazine in advance of the pressure head 159 and be forced against the registering edge wall of the frame 144 so that a turning of the feed wheel 148 will cause the peripheral pins 149 thereof to feed a stream of bristles forward through the feed-way 145.

A shaft 165 is journaled for free rotary movements in the bearing sleeve 143 and is provided in advance of the frame 144 with a crank arm 166 having a control handle 167 and projecting at its outer end over the periphery of the feed wheel 148. A bristle stock separating blade 168 is fixed at its upper end to the free end of the arm 166 and extends therefrom around the rear or magazine side of the wheel in a curve which is concentric to the wheel axis, the inner edge of the blade being separated from the wheel periphery a distance substantially equal to the depth of the feed-way 145. The blade extends between the rows of the feed pins 149 on the wheel and has its nose or lower end tapered so that when the blade is lowered through the stock f in the magazine, the stock will be separated to provide a layer thereof between the wheel and blade while the remaining portion of the stock is forced back into the magazine away from the wheel periphery. When the blade is in stock separating position its lower end extends down into the trough in the elevated rear end portion of the frame 140 and registers at its inner edge with the curved edge of said frame. When it is desired to replenish the row of stock between the blade and wheel, the blade is raised by a forward movement of the arm 166, thereby permitting the stock of the magazine to be forced forward, after which the blade is lowered to separate another row or portion of the stock from the bulk of the same in the magazine.

To facilitate a replenishing of the stock in the magazine the side 152 thereof is hinged at its outer end, thereby permitting an outward swinging of the inner end of the side after first removing the outer holding nuts 156 from the inner set of bolts 153.

A bristle feeding comb 169 (Figs. 6, 24, 29 and 30) is disposed in the trough 141 of the frame 140 lengthwise thereof and is provided on its top with a plurality of longitudinally spaced bristle feeding teeth, which are distributed along the comb from a point below the feed wheel 148 to the forward end of the feed-way 145. This comb is intended to have a short forward bristle feeding movement, with its teeth projecting across the feed-way 145 and to then lower and move rearward in the trough with its teeth free from engagement with the bristle stock in the feed way preparatory to again raising into bristle feeding engagement. For this purpose the comb bar 169 is carried at its rear end by a sleeve 171, which is loosely mounted for rocking movements on a shaft 172 projecting from a slide bar 173 mounted for reciprocatory movements longitudinally in a guide-way 174 provided in the base portion of the frame standard 142. One wall of the guide-way 174 (Fig. 24) has a slot therein through which the shaft 171 projects thereby permitting a limited movement of the shaft, with the slide bar, longitudinally of the frame. A rod 175 projects from the forward end of the bar 173 and has its forward end projecting through a registering opening in the forward end of the frame head 4, the rod being provided without said opening with a stop nut or shoulder 176 for coaction with the standard to limit the rearward movement of the slide bar. A coiled compression spring 177 encircles the rod 175 between a shoulder 178 thereon and the forward portion of the frame head 4 and acts to normally maintain the slide bar and rod at the limit of their rearward movements.

A second slide bar 179 is mounted in the guide-way 174 below the slide bar 173 and projects at its rear or outer end beyond the guide-way and carries a roller 180 at such end for engagement with the periphery of the crank wheel 70. This wheel has its periphery of cam form to impart a desired outward stroke to the bar 179 at each revolution of the wheel (see Fig. 6). In the present instance, when the crank 71 is at the limit of its outward stroke, with the tuft setting nozzle and driver at the limit of their rearward strokes, the cam surface 70ᵃ of the wheel 70 is at the lower portion of the wheel, and when the tuft setting and staple driving parts are at the limit of their forward strokes the cam surface 70ᵃ is just moving into engagement with the slide bar roller 179. The slide bar 179 is provided with an upturned forward end 181, which has an opening through which the rod 175 loosely projects. A coiled compression spring 182 is mounted on the rod 175 between the bar end 181 and a collar or shoulder 183 on the rod so that a forward movement of the bar 179 will communicate a yielding forward movement to the bar 173 and rod 175 through the sleeve 182 and against the tension of the spring 177.

A rocker arm 184 fixedly projects forward from the sleeve 171 and rests at its forward end on the top surface of a cam-block 185, which is mounted for reciprocatory movements longitudinally of the frame in a guide-way 186 in the base portion of the frame head 4 (see Figs. 27, 29 and 30). This block is fixed to the cross-pin 126 to which the connecting bar 74 connects so that it has reciprocatory movements with said pin. The top surface of the cam-block has its rear end raised with respect to its forward end portion so that when the rocker-arm 184 is resting on the raised portion of the block the comb 169 will be raised into stock feeding position, and when the rocker-arm is resting on the lowered forward end portion of the block, the comb will be lowered from stock feeding position. It is thus evident that properly timed raising and lowering movements are imparted to the comb by the cam-block 185 when the latter is reciprocated, and that longitudinal reciprocatory movements are imparted to the comb in forward feeding direction by engagement of the cam-wheel 70 with the roller 180 of the slide bar 179, and movements in the reverse direction are imparted thereto by the spring 177. The purpose of interposing the spring 175 between the slide bar 179 and rod 175 is to permit the comb to stand at rest, should it encounter an obstruction to its forward feeding movement, when the slide bar 179 is positively moved forward by the cam-wheel.

The stock feed-way 145 communicates at its forward end with the upper end of a vertical feed-way 190, which is provided between the forward end portion of the frame 140 and the stationary frame block 146ᵃ and registers at its lower end with the upper end of the feed recess 86 in the top of the nozzle 80 so that bristle tufts may be carried from the forward end of the stock supply in the feed-way 145 down through the passages 190 and 80 into register with the rear end of the nozzle discharge opening 85, as best illustrated in Figs. 7, 8 and 9.

The means employed for delivering bristle tufts from the stock in the guide-way 145 to the nozzle 80 includes male and female stock separating needles 191 and 192, respectively, which are carried by respective plungers 193 and 194 mounted for relative vertical reciprocatory movements in a guide-head 195 projecting laterally from the forward end of the frame standard 142, which head overhangs the forward end of the frame 144. The plunger 193 has a pin 196 projecting therefrom through the back wall of the guide head 195 and connected to one arm of an operating bell-crank lever 197 that is fulcrumed on a stud 198 projecting from the frame head 4. The other arm of this lever extends downward and rearward to a point where it connects with a link 199 (Fig. 24), which is connected to and projects forward from the cross-pin 126, to which the operating connecting bar 74 is engaged. The plunger 194 has a lug 200 projecting therefrom into a registering recess 201 in the plunger 193, which recess is of greater depth than the depth of the lug to permit one plunger to have a predetermined movement relative to the other. A spring pressed pin 202 is carried by the plunger 193 and projects upward through the lower wall of its recess into engagement with the under side of the lug 200 to cushion the upward movement of the plunger 193 relative to the lug. An adjustable stop 203 is threaded through the upper wall of the recess 201 for engagement with the top of the lug 200. The upward movement of the plunger 194 in the guide head is limited by an adjustable stop 204 in the top of the guide head.

The male needle 191 fixedly projects downward from the lower end of the plunger 193, and the female needle 192 projects downward from its plunger for limited rocking movements lengthwise of the frame, being carried by a pivot stud 205 in the plunger. The free end of the needle 192 is provided with a forked rearwardly extending hooked nose, and the needle 191 is pointed in rearwardly spaced relation to the shank of the needle 192 and adapted to enter the fork of the female needle to cooperate therewith to separate a predetermined amount of stock from the forward end portion of the feed-way 145 and to carry the same down to the nozzle opening. When the needles are approximately at the limit of their downward movement, the hooked needle 192 is caused to swing forward from under the placed bristle tuft $d$ so as to permit it to raise without carrying the bristle tuft therewith. This swinging movement of the needle 192 is effected by reason of its upper forwardly extending end 206 coacting with a cam lug 207, which projects inward through a registering slot in the guide head 195 from a block 208 that is adjustably fixed to the forward side of the head (Fig. 9). A spring pressed pin 209 is carried by the plunger 194 above the end 206 of the needle and acts thereon to normally retain the needle in operative relation to the other needle. A positive adjustable stop 210 is provided in the bottom of the plunger 194 for coaction with the part 206 of the female needle to limit the movement thereof which is actuated by the spring pressed pin 209. The forward wall of the guide-way 190 is recessed intermediate its side edges to permit a reciprocation and rocking of the female needle therein.

When the needles are at the limit of their respective upward movements (Fig. 7), the hooked end of the female needle 192 will be disposed immediately below the horizontal plane of the feed-way 145 in position for the bristle stock to feed forward thereover from the feed-way, and the lower end of the male needle 191 will be raised a distance above such feed-way. Upon a downward stroke of the needles the male needle first lowers to cooperate with the hooked end of the female needle to separate a portion of the stock from the stock in the feed-way, and the two needles then move downward together to carry the engaged stock into register with the nozzle opening. Just prior to the needles reaching the limit of their downward movements, the upper end 206 of the female needle engages the cam 207 and effects a swinging of the hooked end of the needle out of vertical register with the engaged bristle stock, the needle being retained in this position during the initial portion of the upward stroke, so that it will pass the stock without carrying it upward therewith.

The block 146ª is provided at its upper end with a guide 211 for the needles, which guide projects above the adjacent portion of the frame 144 between the sides thereof.

The boring spindle shaft 14 has a plunger 215 in sleeved connection therewith and projecting longitudinally therefrom away from the drill carrying end of the shaft in position for a roller 216, carried at its outer end, to bear against the periphery of a cam-wheel 217 mounted on the shaft 19 (see Fig. 4). A lug 218 projects laterally from the outer end portion of the plunger 215 and receives the outer end thrust of a spring 219 disposed in a socket in the plunger guide or bearing 15 at one side of the plunger. It is evident that the cam-wheel 217, at each revolution thereof, imparts a forward brush back drilling stroke to the shaft 14 and then permits a retraction of the shaft under the action of the spring 219.

The stopping and starting of the operating mechanism of the machine is controlled from either one of a pair of control levers 220 and 221 (Figs. 2, 3 and 4) mounted respectively on rock shafts 222 and 223. The shaft 222 is journaled in the frame part 7 and the shaft 223 is journaled in bearings on the farther side of the frame part 3. The shaft 223 has a rocker arm 224 fixedly depending from the end thereof adjacent to the frame part 7 and this arm is connected to the lower arm of the lever 220 by a link 225 (Fig. 3), so that the shaft 222 may be rocked by a movement of either control lever. The shaft 222 carries a forked rocker arm 226 in engagement with a peripheral groove in a shiftable clutch sleeve 227 on the shaft 19. One member of the clutch is fixed to the worm wheel 18, and a movement of the clutch sleeve 227 in one direction is intended to connect the worm wheel to the shaft 19, while a movement thereof in the opposite direction is intended to release the worm wheel with respect to the shaft and to have a braking action on a shoulder or collar 228 on the shaft. Any suitable form of clutch for this purpose may be employed, the clutch illustrated being of a well known type.

For automatically stopping the machine at the completion of the filling of a brush back, I provide the lever 221, which is disposed at the inner end of the frame part 3, has a pin 229 projecting forward therefrom, and when the lever is in operative running position, this pin is intended to be engaged by the hooked end of a rocker arm 230 rising from a shaft 231, mounted on the upper part of the frame base 1 and extending from front to rear thereof, as shown in Figs. 2 and 3. The rocker arm 230 is normally held in engagement with the pin by a coiled contractile spring 232. A rocker arm 233 projects downward from the shaft 231 in position to be engaged and rocked by a pin 234 on the worm wheel 28 in the frame base when the pin is at a predetermined point in its revolution, such rocking of the arm causing a movement of the hooked arm 230 to release the lever pin 229. A coiled contractile spring 235 is connected to the rocker arm 224 and acts thereon to impart a clutch releasing movement to the control levers when the hooked arm 230 is moved to release the pin 229, thus effecting a stopping of the mechanism. A control lever 236 is mounted on the forward end of the shaft 231 so that it may be normally operated to move the hooked arm 230 from engagement with the lever pin 229.

In the operation of my machine, one brush back carrying head has a brush back 50 to be bored mounted on the plate 49 of its rocker frame 48, and the other has a bored brush back mounted on its rocker frame 48 in position to be filled. As the machine operates, the rocker heads 40 are horizontally turned and the rocker frames 48 are vertically rocked in accordance with the formation of the respective cam wheels 30 and 31 so that the respective brush backs are moved to successive predetermined positions for boring or filling as the case may be. The thrusts of the boring and setting tools against the brush backs are opposed by thrust screws 58 acting against the curved surfaces of the thrust bars 56 on the outer ends of the heads 40. The horizontal rocking movements of the heads 40 are controlled from the cam wheel 30 through the medium of the bars 32 and 62, helical racks 61 and helical pinions 60, which latter are carried by the shafts 39 of the heads. The vertical rocking of each frame 48 is controlled from the cam wheel 31 through the medium of the bar 33, a cross arm 64 and vertical rods 54, which latter have their upper ends straddling a cross-bar 52 of the rocker frames in advance of the rocking axes thereof. The cam wheels 30 and 31 are driven from the clutch control shaft 19 through the medium of the intermittent drive worm and pinion 21 and 22, shaft 23 and worm and worm-wheels 29 and 28. The intermittent drive means 21, 22 imparts a slight predetermined movement to the cam wheels 30 and 31 at each revolution of the shaft 19, such movement depending on the pitch of the worm thread 21, and after such movement the cam wheels are locked against movement by the passage of a pinion tooth or roller through the neutral portion c of the worm. During a running of the motor 10 the boring drill shaft 14 is continually driven at high speed by reason of its connection with the motor shaft, and when the shaft 19 is in operation the cam wheel 217 at each revolution of said shaft will impart a forward hole boring movement to the drill shaft, the shaft being then retracted by the action of the spring 219. During a forward hole drilling stroke of the shaft 14, the crank operated connecting rods 74, 75 are being simultaneously moved forward, the former to impart a staple driving and bristle setting stroke to the driver bar 133 and the latter to impart first a forward movement to the staple cutting and forming bar 91 and then to cause said bar to act on and impart a forward tuft placing stroke to the nozzle 80. The relative arrangement and lengths of the cranks 72 and 73, with the latter shorter and slightly advanced in position with respect to the former, causes the staple driver 133 to have a much longer stroke than the nozzle so that by the time the nozzle has completed its forward stroke or moved into coaction with the outer marginal edge wall of a registering brush back hole to be filled, the driver bar will have caught up with the nozzle and the outer ends of the two will be approximately in transverse register. The nozzle, which has completed its forward stroke, will then commence to recede from the brush back while the driver, due to the trailing action of its crank relative to the nozzle operating crank, will continue its forward movement to force the engaged staple and bristle tuft into the hole. An important purpose of retracting the nozzle from a brush back before the driver has completed its forward stroke is to permit the tuft of bristles being set in the brush back to be closely positioned, and not spread apart by the nozzle ends. Another important purpose of this relative movement of the nozzle and driver is to prevent the nozzle from denting the marginal edge wall of a brush back hole when the driver is forcing a bristle tuft and its anchoring means into the hole. During the initial forward movement of the bar 91 relative to the nozzle, a length of staple wire 106, which was previously fed into the recess 90 in advance of the severing and staple forming part 102 of the bar 91, is severed from the feed wire and then forced forward against the anvil 109 by which it is doubled upon itself and forced into the forming groove 101 of the bar 91. As the nozzle moves forward with the forming bar 91, the anvil plunger 108 passes from engagement with the cam block 111 and the anvil is then retracted from staple forming position by the spring 110. The driver bar 133 then moves forward to force the staple from the forming bar groove into the nozzle and around a registering tuft *d* therein, the staple and tuft then being moved forward together through the nozzle, during which movement the tuft is doubled rearward upon itself by the tapered form of the nozzle opening 85. On the rearward stroke of the nozzle, the nozzle bar 81 and forming bar 91 move rearward together until the former has moved into stop contact with the rear end of the guide 76, the forming bar then continuing its rearward movement alone a predetermined distance due to the yieldability of the spring 98. During this relative rearward movement of the nozzle and forming bar the feeding of a wire length into the recess 90 is effected due to the driver plunger 124 striking the upturned end of the wire feed bar 118 and moving said bar therewith.

The spring guard tongue 138 is moved laterally out of obstructing relation with the nozzle just prior to the registering of the latter with the brush back and this movement causes a deflection of any previous set bristles from the end of the advancing nozzle. During a rearward stroke of the nozzle and plunger, the stock separating needles 191 and 192 are lowered to carry a tuft of stock bristles from the forward end of the guideway 145 down into the nozzle opening in position to be engaged by the next advancing staple, and at the same time the stock feeding comb 169 has a forward stock feeding movement imparted thereto to advance the stock a slight distance in the feed-way 145. This movement of the comb is caused by the cam surface 70ª on the crank wheel 70 engaging the roller 180 on the slide bar 179 and moving said bar forward against the tension of the spring 177, such movement being communicated to the slide bar 173 through the thrust spring 182 and thence through the pin or shaft 172 to the comb. When the comb has reached the limit of its forward movement the cam block 185, which is moved backward with the connecting rod 174 with which it is connected through the cross pin 176, will have reached a position to permit the rocker arm 184 to pass down the inclined top surface thereof, thereby lowering the comb from stock engaging position. On the next forward stroke of the staple and tuft setting parts, the cam block 185 will be moved forward and cause a raising of the comb into stock engaging position preparatory to the next forward stock feeding movement thereof. The comb teeth during a feeding movement of the comb interengage with the teeth on the feed wheel 148 so as to impart a slight forward movement to the wheel at each forward feeding movement of the comb. The ward feeding movement of the wheel will feed stock from movement of the magazine down into the guide-way 145. The stock separating blade 168 may be raised and lowered through the stock in the magazine as often as it is desired to replenish the row of stock between the blade and the feed wheel. During a rearward movement of the staple and tuft setting members, the bell crank lever 197 is rocked to cause a lowering of the stock separating needles 191 and 192. During this movement the plunger 193 carrying the male needle 191 is first lowered into cooperating stock holding relation to the female needle 192 and the two needles then lower together by reason of the arm 200 of the plunger 194 being engaged by the upper end wall of the recess 201 in the plunger 193 in which said arm works. When the needles are near the limit of their downward movements the upper laterally projecting end 206 of the female needle engages the cam block 207, thereby causing a rocking of the needle to swing its lower end forward from under the engaged bristle tuft so that the needle may be raised without carrying the tuft therewith.

It is evident that during the rearward movement of the former bar 91, relative to movement of the former bar 91, a length of wire 106 is fed into the nozzle, a length of wire and a bristle tuft staple forming position and a bristle tuft deposited in the nozzle by the stock separating needles. It is also evident that a substitution of the crank operating means for the cam operating means commonly employed for operating the tuft and staple driving and setting parts of a brush making machine imparts a more positive and accurate movement to the tuft and staple setting rate movement to the tuft and staple setting parts and enables the movements of the same to be more perfectly controlled. The operating of the stock feeding and separating means from the operating means for the tuft and staple setting members is also an important feature and enables accurate timing of the relative movements of the different parts.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is,—

1. In a machine of the class described, a tuft placing nozzle, a tuft setting plunger, and mechanism operatively connected to impart relative movements to the nozzle and plunger and to cause an initial retracting movement of the nozzle while the plunger is completing its tuft setting movement.

2. In a machine of the class described, a tuft placing nozzle, a tuft setting plunger, and mechanism having cranks of different lengths connected respectively to the nozzle and plunger and operable to advance and retract the same and to reverse the advancing movement of the nozzle prior to that of the plunger.

3. In a machine of the class described, a pair of coaxial revoluble cranks of different lengths with one trailing behind the other, and a tuft placing nozzle connected to one, and a tuft setting plunger connected to the other crank and operated thereby.

4. In a tuft setting mechanism of a brush machine, the combination of a reciprocable tuft placing nozzle, a reciprocable plunger movable relative thereto and means operable to advance said nozzle and said plunger at different speeds and to reverse the movement of the one before that of the other.

5. In a machine of the class described, a tuft setting mechanism having a placing nozzle, and a driving plunger, the latter for ejecting a bristle tuft from the nozzle and setting it in a registering article, a long-throw crank connected to the plunger and a short-throw crank connected to the nozzle, the cranks having a common axis and the latter being slightly advanced whereby the plunger is caused to project beyond the nozzle after a reversal of the movement of the nozzle during a tuft setting stroke thereof.

6. In a machine of the class described, a tuft setting mechanism having a placing nozzle and a setting plunger, the latter operable through the former, and means operable to advance the nozzle and plunger, the latter at the greater speed and when the forward ends of the plunger and nozzle are approximately in transverse register to then reverse the movement of the nozzle while the plunger continues its stroke a predetermined distance.

7. In a machine of the class described, a reciprocably mounted tuft placing nozzle, an anvil mounted on said nozzle, a staple forming member having limited movement relative thereto and yieldingly connected to the nozzle and adapted to cooperate with said anvil to form a staple, and means operable to impart predetermined movements to the member relative to the nozzle and anvil and then to cause the member to move the nozzle.

8. In a machine of the class described, a guide, a nozzle bar reciprocally movable in the guide and having a tuft placing nozzle at its forward end, an anvil mounted on said nozzle, a staple forming bar mounted in the guide for limited longitudinal movements relative to the nozzle bar and for predetermined movements therewith, the forming bar acting as the drive means for the nozzle bar, means yieldingly connecting the nozzle bar and forming bar for limited relative movements, and means operable to move the forming bar a predetermined distance relative to the nozzle bar to cooperate therewith to form a staple from a wire section disposed therein, then to cause the forming bar to act on the nozzle bar to impart first a forward and then a rearward stroke to the latter.

9. In a machine of the class described, a reciprocable tuft placing means, a staple forming anvil movably carried thereby and normally disposed in inoperative position, means for moving the anvil to staple forming position when the tuft placing means is in retracted position, and means having limited movement relative to the tuft placing means and operable to coact therewith and with the anvil to form a staple from a wire section disposed therein and then to move the tuft placing means to and from tuft placing position.

10. In a machine of the class described, a tuft placing means, a staple forming member and a setting plunger mounted for relative reciprocatory movements in a common plane, an anvil carried by said tuft placing means, means operable to move the member to cooperate with said anvil to form a staple from a section of wire fed thereto and then to move the placing means to and from tuft placing position and also to impart a longer stroke to the setting plunger to discharge a formed staple and registering tuft from the nozzle means during the forward stroke thereof and then to retract the plunger, and means automatically operable to feed a wire section to forming position during the last portion of the rearward stroke of the forming member.

11. In a brush machine, a reciprocable tuft placing nozzle, a tuft deflector yieldably carried thereby in protecting relation thereto, said deflector being movable relative to said nozzle, and a stop arranged in the path of movement of said deflector for arresting the forward movement of the same prior to the termination of the movement of said nozzle, whereby said deflector is displaced from the path of the nozzle.

12. In a brush machine, a member mounted for reciprocation, means connected to said member adapted to impart a simple harmonic motion thereto, a nozzle member also reciprocably mounted and yieldably connected to said member for movement relative thereto, a stop for arresting said nozzle member during the low velocity portion of the rearward harmonic reciprocation of said member to permit insertion of a tuft within said nozzle member, staple-forming elements respectively carried by said member and said nozzle adapted to cooperate to form a staple during the relative movement thereof, and means for ejecting a staple and tuft from said nozzle.

13. In a brush machine, a member mounted for reciprocation, means connected to said member adapted to impart a simple harmonic motion thereto, a nozzle member also reciprocably mounted and yieldably connected to said member for movement relative thereto, a staple forming element on each of said members, means for feeding a wire between said elements during the relative movement of said members, said staple forming elements cooperating to form a staple from said wire during the relative movement of said members, and means for ejecting the formed staple and tuft from said nozzle.

14. In a brush machine, a member mounted for reciprocation, means connected to said member adapted to impart a simple harmonic motion thereto, a nozzle also reciprocably mounted and yieldably connected to said member for movement relative thereto, a stop for arresting said nozzle during the low velocity portion of the rearward harmonic reciprocation of said member to permit insertion of a tuft within said nozzle, means for depositing a tuft in said nozzle during the interval of rest thereof, staple-forming elements carried by said member and said nozzle respectively adapted to cooperate during said interval of rest to form a staple, and an inserter adapted to engage said staple and carry the same with the deposited tuft through said nozzle.

15. In a brush machine, a member mounted for reciprocation, means connected to said member adapted to impart a simple harmonic motion thereto, a nozzle member also reciprocably mounted and yieldably connected to the first mentioned member for movement relative thereto, a stop for arresting movement of said nozzle member during a portion of the reciprocation of the first mentioned member to permit engagement of a tuft with said nozzle member, a staple former element carried by said first mentioned member, an anvil carried by said nozzle member adapted to cooperate with said staple former element to form a staple, means for moving said anvil from the path of said staple during the movement of said nozzle member, and means for ejecting a formed staple and tuft from said nozzle member.

16. In a brush machine, a reciprocable tuft delivering nozzle member, a reciprocable slide, means for positively reciprocating said slide, a lost motion connection between said nozzle member and slide for actuating the former from the latter, said connection allowing a relative movement of said nozzle and slide during the initial forward stroke, staple forming elements upon said nozzle member and slide adapted to cooperate during the relative movement thereof to form a staple, and means for ejecting a formed staple and tuft from said nozzle member.

17. In a brush machine, a reciprocable tuft delivering nozzle member, a reciprocable slide, means for positively reciprocating said slide, a lost motion connection between said nozzle member and slide for actuating the former from the latter, said connection allowing a relative movement of said nozzle member and slide during the initial forward stroke, staple-forming members upon said nozzle member and slide adapted to cooperate during the relative movement thereof to form a staple, means for feeding a wire between said staple-forming members during the rearward movement of said slide relative to said nozzle, and means for ejecting a formed staple and tuft from said nozzle.

18. In a brush machine, a member mounted for reciprocation, means connected to said member adapted to impart a simple harmonic motion thereto, a nozzle member also reciprocably mounted and yieldably connected to said member for movement relative thereto, a stop for arresting movement of said nozzle member during the low velocity portion of the rearward harmonic reciprocation of said member to permit insertion of a tuft within said nozzle, a staple former element carried by the first mentioned member, an anvil carried by said nozzle member, means for moving said anvil to and from staple-forming position during the movement of said nozzle member, a reciprocably mounted tuft inserter movable through said staple former and said nozzle, and means for imparting a simple harmonic motion to said tuft inserter for ejecting the staple and tuft from said nozzle member.

19. A tuft setting unit for a brush machine comprising a housing, three parallelly moving slides within said housing, means projecting through apertures in said housing from two of said slides adapted to be detachably connected to cranks of different throws, a nozzle projecting from said housing and rigidly attached to said third slide, a yieldable connection between said third slide and one of the other two slides, a stop for arresting movement of said third slide during the movement of the other two slides, staple-forming elements carried by the respective slides having said yieldable connection therebetween, and an inserter carried by the slide not provided with said yieldable connection.

20. A tuft setting unit for a brush machine comprising a housing having a guideway, three parallelly moving slides within said guideway, a nozzle connected to one of said slides and projecting from said housing, connections to the other to slides projecting laterally through said housing, said connections being adapted to be detachably connected to cranks of different throws, a yieldable connection between said nozzle-carrying slide and one of the other slides, and a stop for arresting movement of said nozzle-carrying slide prior to the completion of the movement of the slide yieldably connected thereto.

21. A tuft setting unit for a brush machine comprising a housing having a guideway therein, four parallelly moving slides within said guideway, a nozzle projecting from said housing and connected to one of said slides, members projecting laterally through said housing and respectively connected to the second and third slides, a lost motion connection between said nozzle-carrying slide and one of the slides provided with a laterally projecting member, a tuft deflector adjacent said nozzle and carried by said fourth slide, a yieldable connection between said fourth slide and said nozzle-carrying slide, and a stop for arresting movement of said fourth slide prior to the completion of the forward movement of said nozzle-carrying slide.

In testimony whereof I have hereunto signed my name to this specification.

CONRAD JOBST.